April 14, 1925.

F. W. GURNEY

BEARING

Filed May 23, 1921

1,533,184

INVENTOR.
Frederick W. Gurney,
By Parker & Rockwood.
ATTORNEYS.

Patented Apr. 14, 1925.

1,533,184

UNITED STATES PATENT OFFICE.

FREDERICK W. GURNEY, OF JAMESTOWN, NEW YORK, ASSIGNOR, BY MESNE ASSIGNMENTS, TO MARLIN-ROCKWELL CORPORATION, OF JAMESTOWN, NEW YORK, A CORPORATION OF NEW YORK.

BEARING.

Application filed May 23, 1921. Serial No. 471,787.

*To all whom it may concern:*

Be it known that I, FREDERICK W. GURNEY, a citizen of the United States, residing at Jamestown, in the county of Chautauqua and State of New York, have invented a new and useful Improvement in Bearings, of which the following is a specification.

This invention relates to bearings, and more particularly to improvements in roller or ball bearings of the self-contained or unitary type, in which the inner and outer race rings and interposed balls or rolling bearing members when assembled are retained in the assembled relation so that the bearing can be handled as a unit.

One object of the invention is to improve the construction of bearings of this type so as to make the bearings more durable, better able to resist the rough usage to which such devices are subjected in use, and also more efficient in retaining lubricant in and excluding dirt from the bearings, than such bearings as heretofore constructed.

Other objects of the invention are to provide a dirt-excluding bearing in which the lubricant-retaining means are arranged inside of the dirt-excluding means so that dirt and water will not get into the lubricant-retaining packing and interfere with or destroy the efficiency of the same; also to construct the bearings so that the lubricant-retaining and dirt-excluding means are protected and retained between the two bearing rings of the bearing, so that the tendency for said parts to become detached from the bearing is avoided; and also to improve bearings in the other respects herein described and set forth in the claims.

Figure 1:
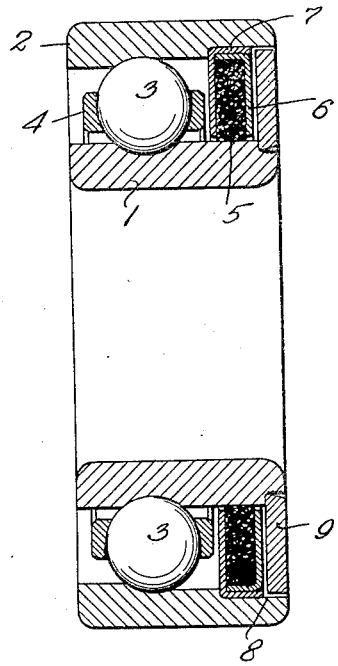
Fig. 1 is a longitudinal sectional elevation of a ball bearing embodying the invention.
Figure 2:
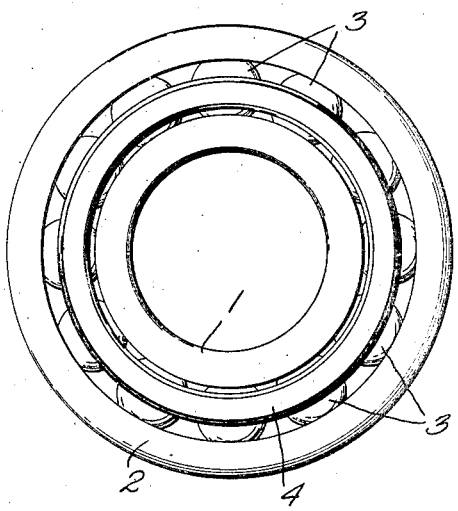
Figs. 2 and 3 are elevations respectively of the opposite end of the bearing.
Figure 3:
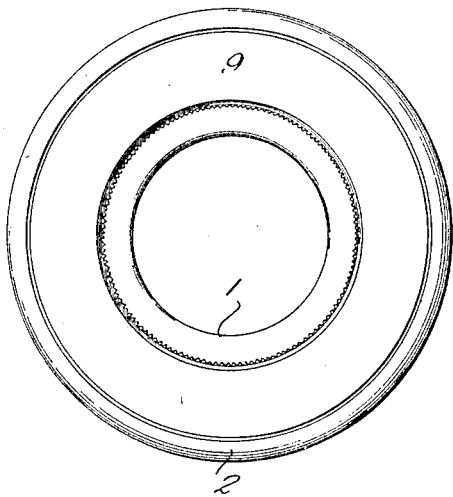

1 and 2 represent respectively the inner and outer bearing or race rings of the bearing, 3 the balls or rolling bearing members interposed between and adapted to roll in opposed raceways in the bearing rings, and 4 a ball separator or spacing device. These parts, except as hereinafter explained, may be of any usual or suitable construction and arrangement.

The invention includes a lubricant retainer for the purpose of preventing lubricant from escaping from the bearing. The lubricant retainer is preferably a device or part rigid with the outer bearing ring 2. In the embodiment illustrated, 5 represents a ring or packing of felt, cork or other suitable material adapted to assist in retaining lubricant in the bearing. This packing is located between the inner and outer rings 1 and 2 at one side of the bearing parts and surrounds or is adapted to rub against the outer surface of the inner ring. It is preferably confined or retained in a holder formed by two metal cups or flanged disks 6 and 7, preferably of stamped steel, which fit tightly one within the other. The outer cup 7 preferably fits in a counterbore 8 in the extended end portion of the outer bearing ring 2. The lubricant retainer comprising the inner and outer cups and the interposed packing, is preferably pressed with a tight fit into the counterbore 8 so that the lubricant retainer is thus secured permanently in the bearing and is rigid with or caused to turn with the outer bearing ring 2.

Secured to the end of the inner bearing ring at the outer side of the lubricant retainer is a sealing member or washer 9, preferably of steel which runs with a slight clearance between it and the lubricant retainer, and also preferably with a slight clearance between its outer periphery and the counterbore of the outer bearing ring within which the washer is located. This washer or sealing member is preferably shrunk on a reduced and knurled step or seat on the inner bearing ring 1 with the outer face of the washer practically flush with the ends of the inner and outer bearing rings 1 and 2. The sealing member is thus securely fixed to and caused to turn with the inner bearing ring.

The washer 9 and the lubricant retainer arranged as described, with the slight clearance or space between them, form a dirt seal or dirt-expelling device. The opposed, relatively movable faces of the washer 9 and the lubricant retainer act like the two grinding surfaces of an old fashioned pair of mill burrs or mill stones. It is impossible for dirt to work inwardly from the circumferential to the central portion of these two co-acting faces and so get into the bearing. Any dirt or substance that may get between these two faces is by the relative movement of the same worked outwardly and discharged through the space between the outer periphery of the washer 9 and the surrounding counterbore surface of the outer bearing ring. Thus, the lubricant-retaining ring or packing 5 is disposed inside of the dirt seal or dirt-excluding means so that dirt and water will not get into the packing and destroy its efficiency. Both the lubricant-retaining device and the dirt seal device are enclosed between the two bearing or race rings and permanently secured thereby preventing these parts from becoming detached from the bearing. A very durable and efficient lubricant-retaining and dirt-excluding construction is therefore produced.

The bearing described is particularly desirable as the inside bearing for the front wheels of automobiles, the bearing being mounted so that the dirt-excluding washer is exposed to the dirt and water at the inside of the wheel. No other seal of any kind is required. The dirt proof bearing thus becomes in itself the closure for the inside end of the wheel hub.

While the invention is herein described in connection with a unitary ball bearing, manifestly it is applicable also to bearings of other construction than that herein specifically illustrated and described.

I claim as my invention:

1. In a bearing, the combination with inner and outer bearing rings, of a sealing member for one end of said bearing which is fixed to said inner bearing ring and extends outwardly therefrom, and a member which is fixed to said outer bearing ring and extends inwardly therefrom at the inner side of said sealing member, said members having opposing, relatively movable, substantially parallel, rigid faces separated by a narrow space which extends in a direction outwardly away from the axis of the bearing and leads at its outer portion to the exterior of the bearing, whereby said parts tend to cause any dirt in said space to work outwardly therefrom.

2. In a bearing, the combination with inner and outer bearing rings, and interposed rolling bearing members, of a sealing member which is fixed to said inner bearing ring and extends outwardly therefrom at one side of said rolling bearing members, and a lubricant retainer which is fixed to said outer bearing ring and extends inwardly therefrom between said sealing member and said rolling bearing members, said lubricant retainer and sealing member having opposing, relatively movable, substantially parallel, rigid faces separated by a narrow space which extends in a direction outwardly away from the axis of the bearing and leads at its outer portion to the exterior of the bearing, whereby said parts tend to cause any dirt in said space to work outwardly therefrom.

3. In a bearing, the combination with inner and outer bearing rings, of a sealing member fixed to one end of said inner bearing ring and extending outwardly therefrom into proximity to said outer bearing ring, a packing between said bearing rings, and a retainer for said packing fixed to said outer bearing ring and extending inwardly therefrom at the inner side of said sealing member, said retainer and sealing member having relatively movable, substantially parallel, rigid faces separated by a narrow space which extends in a direction outwardly away from the axis of the bearing and leads at its outer portion to the exterior of the bearing, whereby said parts tend to cause any dirt in said space to work outwardly therefrom.

4. In a bearing, the combination with inner and outer bearing rings, of a sealing member fixed to one end of said inner bearing ring and extending outwardly therefrom into proximity to said outer bearing ring, and a lubricant retainer comprising an annular holder fixed in said outer bearing ring and extending inwardly therefrom at the inner side of said sealing member, and a packing in said holder surrounding the inner bearing ring, said retainer having an annular wall between said packing and said sealing member substantially parallel to said sealing member and separated therefrom by a narrow space which extends in a direction outwardly away from the axis of the bearing and leads at its outer portion to the exterior of the bearing, whereby said parts tend to cause any dirt in said space to work outwardly therefrom.

5. In a bearing, the combination with inner and outer race rings, and interposed rolling bearing members, of a sealing member which is fixed to said inner race ring at one side of said rolling bearing members and extends outwardly therefrom into proximity to said outer race ring, a packing ring surrounding said inner race ring between said rolling bearing members and said sealing member, and a retainer for said packing ring fixed to said outer race ring and extending inwardly therefrom at the inner side of said sealing member, said retainer having an annular wall between said packing and said sealing member substantially parallel to said sealing member and separated therefrom by a narrow space which extends in a direction outwardly away from the axis of the bearing and leads at its outer portion to the exterior of the bearing, whereby said parts tend to cause any dirt in said space to work outwardly therefrom.

6. In a bearing, the combination with inner and outer race rings, and interposed rolling bearing members, of a sealing member which is fixed to said inner race ring at one side of said rolling bearing members and extends outwardly therefrom within said outer race ring, and a lubricant retainer comprising interfitting annular flanged disks fixed in said outer race ring and extending inwardly therefrom at the inner side of said sealing member, and a packing confined between said disks and surrounding the inner bearing ring, said retainer and sealing member having relatively movable faces beyond said packing separated by a narrow space which extends in a direction outwardly away from the axis of the bearing and leads at its outer portion to the exterior of the bearing, whereby said parts tend to cause any dirt in said space to work outwardly therefrom.

7. In a bearing, the combination with inner and outer race rings, and interposed rolling bearing members, said inner race ring having one end reduced and said outer race ring having its corresponding end counterbored, of a sealing member fixed on said reduced end of the inner race ring and extending outwardly therefrom within said outer race ring, and a lubricant-retainer comprising an annular holder fixed in the counterbore of said outer race ring and extending inwardly therefrom at the inner side of said sealing member, and a packing in said holder surrounding the inner race ring, said retainer and sealing member having relatively movable substantially parallel faces separated by a narrow space beyond said packing which space extends in a direction outwardly away from the axis of the bearing and leads at its outer portion to the exterior of the bearing, whereby said parts tend to cause any dirt in said space to work outwardly therefrom.

8. In a bearing, the combination with inner and outer bearing rings, and interposed rolling bearing members, of a sealing member which is rigid with said inner bearing ring and extends outwardly therefrom with its outer face flush with the adjacent ends of rings, and a lubricant-retaining device which is rigid with said outer bearing ring and extends inwardly therefrom between said sealing member and said rolling bearing members, said lubricant-retaining device and sealing member having opposing relatively movable faces separated by a narrow space which extends in a direction outwardly away from the axis of the bearing and leads at its outer portion to the exterior of the bearing whereby said parts tend to cause any dirt in said space to work outwardly therefrom.

9. In a bearing, the combination with inner and outer rings and interposed rolling bearing members, of a sealing part at one end of said bearing which is rigid with said inner bearing ring and extends outwardly therefrom, a packing between said bearing rings, and a packing-retaining part rigid with said outer bearing ring and extending inwardly therefrom at the inner side of said sealing part, said sealing part and said packing-retaining part having opposing relatively movable faces separated by a narrow space which extends in a direction outwardly away from the axis of the bearing and leads at its outer portion to the exterior of the bearing, whereby said parts tend to cause any dirt in said space to work outwardly therefrom.

FREDERICK W. GURNEY.